United States Patent
Nandakumar et al.

(10) Patent No.: US 10,394,579 B2
(45) Date of Patent: Aug. 27, 2019

(54) AUTOMATICALLY FIXING INACCESSIBLE WIDGETS DURING MOBILE APPLICATION EXECUTION

(71) Applicant: International Business Machines Corporation, Armonk, NY (US)

(72) Inventors: Vikrant Nandakumar, Bangalore (IN); Vivek Sharma, Bangalore (IN); Vijay Ekambaram, Bangalore (IN); Ashish K. Mathur, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 14/227,252

(22) Filed: Mar. 27, 2014

(65) Prior Publication Data

US 2015/0279070 A1 Oct. 1, 2015

(51) Int. Cl.
*G06F 9/451* (2018.01)
*G06F 3/0481* (2013.01)
*H04M 1/725* (2006.01)
*G09B 21/00* (2006.01)

(52) U.S. Cl.
CPC ............ *G06F 9/451* (2018.02); *G06F 3/0481* (2013.01); *G09B 21/006* (2013.01); *H04M 1/72594* (2013.01)

(58) Field of Classification Search
CPC ............ G06F 3/0481; G06F 17/30247; G06F 17/241; G06F 9/451; H04M 1/72594; G09B 21/006; G09B 21/007; G09B 21/001; G09B 21/00; G09B 21/04
See application file for complete search history.

(56) References Cited

U.S. PATENT DOCUMENTS

| 8,196,104 B2 | 6/2012 | Cohrs et al. |
| 8,250,477 B1 * | 8/2012 | Schwarzberg ............ G06F 8/38 |
| | | 715/205 |
| 2003/0229628 A1 * | 12/2003 | Banerjee ............... G06F 16/532 |

(Continued)

FOREIGN PATENT DOCUMENTS

CA     2536999 A1 *  8/2006  ........... G06F 1/1626

OTHER PUBLICATIONS

Google, UI Testing, https://web.archive.org/web/20140311015427/https://developer.android.com/tools/testing/testing_ui.html, Mar. 11, 2014.

(Continued)

*Primary Examiner* — Kieu D Vu
*Assistant Examiner* — Blaine T. Basom
(74) *Attorney, Agent, or Firm* — Ryan, Mason & Lewis, LLP (57) ABSTRACT

Methods, systems, and articles of manufacture for automatically fixing inaccessible widgets during mobile application execution are provided herein. A method includes identifying an image element from a set of one or more user interface elements of an application that are inaccessible to a given set of users; generating a text description associated with the image element; extracting a portion of the text description related to an accessibility property of the image element; and adjusting the accessibility property of the image element to render the image element accessible to the given set of users.

14 Claims, 4 Drawing Sheets

(56) References Cited

U.S. PATENT DOCUMENTS

| | | | |
|---|---|---|---|
| 2004/0148568 A1* | 7/2004 | Springer | G06F 17/30899 715/205 |
| 2006/0063138 A1* | 3/2006 | Loff | G09B 21/00 434/112 |
| 2006/0195819 A1 | 8/2006 | Chory et al. | |
| 2008/0307043 A1* | 12/2008 | Dorsey | G06F 17/3089 709/203 |
| 2009/0300709 A1* | 12/2009 | Chen | G06F 17/30893 726/1 |
| 2010/0077322 A1* | 3/2010 | Petro | H04N 21/4884 715/760 |
| 2010/0205523 A1* | 8/2010 | Lehota | G06F 17/30905 715/235 |
| 2011/0119289 A1 | 5/2011 | Fields et al. | |
| 2012/0290914 A1* | 11/2012 | Lee | G06F 17/24 715/234 |
| 2014/0146053 A1* | 5/2014 | Cragun | G06F 17/30247 345/467 |
| 2014/0180846 A1* | 6/2014 | Meron | G06F 17/3089 705/14.73 |
| 2014/0351687 A1* | 11/2014 | Hall | G06F 16/957 715/234 |
| 2014/0351796 A1* | 11/2014 | Gur-esh | G06F 11/3644 717/126 |
| 2015/0123982 A1* | 5/2015 | Schoening | G06T 11/001 345/589 |
| 2015/0149168 A1* | 5/2015 | Stent | G06F 17/243 704/235 |
| 2015/0161086 A1* | 6/2015 | Wu | G06F 3/04842 715/234 |
| 2015/0242384 A1* | 8/2015 | Reiter | G06F 3/04842 715/202 |
| 2016/0048307 A1* | 2/2016 | Troyer | G06F 9/4448 715/801 |

OTHER PUBLICATIONS

O'Reilly, VoiceOver, https://web.archive.org/web/20120905175457/http://examples.oreilly.com/9780596804299/voice-over-free-bonus-appedix.pdf, Dec. 3, 2012.

IBM Rational Policy Tester, 2007.

HiSoftware Compliance Sheriff, http://hisoftware.web4.wakeflywebsites.com/Libraries/PDFs/ComplianceSheriffv4_datasheet_10-10.sflb.ashx, 2013.

Wikipedia, WebAIM, https://en.wikipedia.org/w/index.php?title=WebAIM&oldid=579508761, Oct. 30, 2013.

Gay et al. A Checker: Open, Interactive, Customizable, Web Accessibility Checking, W4A'10 Proceedings of the 2010 International Cross Disciplinary Conference on Web Accessibility (W4A).

Koutsabasis et al. Beyond Specifications: Towards a Practical Methodology for Evaluating Web Accessibility, Aug. 2010.

Petrie et al. People with Disabilities: Automatic and Manual Evaluation of web sites, 2006.

* cited by examiner

AUTOMATICALLY FIXING INACCESSIBLE WIDGETS DURING MOBILE APPLICATION EXECUTION

FIELD OF THE INVENTION

Embodiments of the invention generally relate to information technology, and, more particularly, to mobile application technology.

BACKGROUND

Mobile accessibility testing, as described herein, is a process by which an application is tested for its degree of accessibility to certain users, such as visually challenged users, blind users, deaf users, etc. Different operating systems face different challenges and provide different limitations with respect to accessibility. For example, in connection with the Android system, accessibility labels are not set for user interface (UI) elements. Additionally, Android's Talkback (a screen reader service) and Explore by Touch (a complimentary service to Talkback) features recognize text inside a UI widget and read the text to the user. The Talkback and Explore by Touch features also make some inaccessible elements completely accessible to the user, such as UI elements including TextView and Button. However, for elements such as ImageView, ImageButton, and EditText with or without hints, the Talkback feature fails to make the elements accessible unless the accessibility property is explicitly set.

By way of another example, in connection with the iOS system, accessibility labels are similarly not set for UI elements. iOS' VoiceOver feature recognizes the text inside a UI widget and reads the text to the user. Additionally, the VoiceOver feature makes elements such as UILabel, UIButton, and UITableView that are inaccessible to certain types of users (such as users with one or more sensory impairments) completely accessible to such users. However, for elements such as UIImageView, UIButton with ImageView instead of text, and UITextField with or without placeholder, the VoiceOver feature fails to make the elements accessible unless the accessibility label is explicitly set.

Existing accessibility testing approaches can include providing a Boolean report indicating whether a UI element is accessible or inaccessible. However, some existing approaches include scanning UI layout files, a technique which fails to capture the dynamic behavior of the element during application execution. Additionally, manually fixing inaccessible elements by setting appropriate accessibility properties is tedious and often time-consuming.

Accordingly, a need exists for techniques to automatically fix inaccessible UI widgets of a mobile application.

SUMMARY

In one aspect of the present invention, techniques for automatically fixing inaccessible widgets during mobile application execution are provided. An exemplary computer-implemented method can include steps of identifying an image element from a set of one or more user interface elements of an application that are inaccessible to a given set of users; generating a text description associated with the image element; extracting a portion of the text description related to an accessibility property of the image element; and adjusting the accessibility property of the image element to render the image element accessible to the given set of users.

In another aspect of the invention, an exemplary computer-implemented method can include steps of identifying a text element from a set of one or more user interface elements of an application that are inaccessible to a given set of users; determining an associated label for the identified text element; extracting one or more properties of the associated label, wherein said one or more properties are related to an accessibility property of the identified text element; and adjusting the accessibility property of the identified text element to render the identified text element accessible to the given set of users.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes automatically adjusting and/or fixing inaccessible widgets during mobile application execution. As noted herein, existing approaches for accessibility testing primarily target web applications. Mobile applications, however, are often significantly different from web applications with respect to design, development and deployment. Existing web accessibility testing approaches generally involve human intervention to decipher reports and apply appropriate remedies.

Accordingly, as detailed herein, at least one embodiment of the invention includes automatically fixing or remedying the inaccessibility nature of a mobile application UI widget dynamically during runtime by using an output from associated label mapping (ALM) and/or image-based content retrieval (IBCR) techniques. For example, at least one embodiment of the invention includes extracting all UI elements from an image button based on ALM techniques and setting an accessibility property based thereon. Additionally, such an embodiment can also include extracting content from the image using IBCR techniques and setting an accessibility property based thereon. By way of example, for Android applications, accessibility properties can include android:contentDescription and android:hint. Additionally, for example, for iOS applications, accessibility properties can include accessibilityLabel, accessibilityHint, accessibilityValue, accessibilityFrame and accessibilityTraits.

Figure 1:
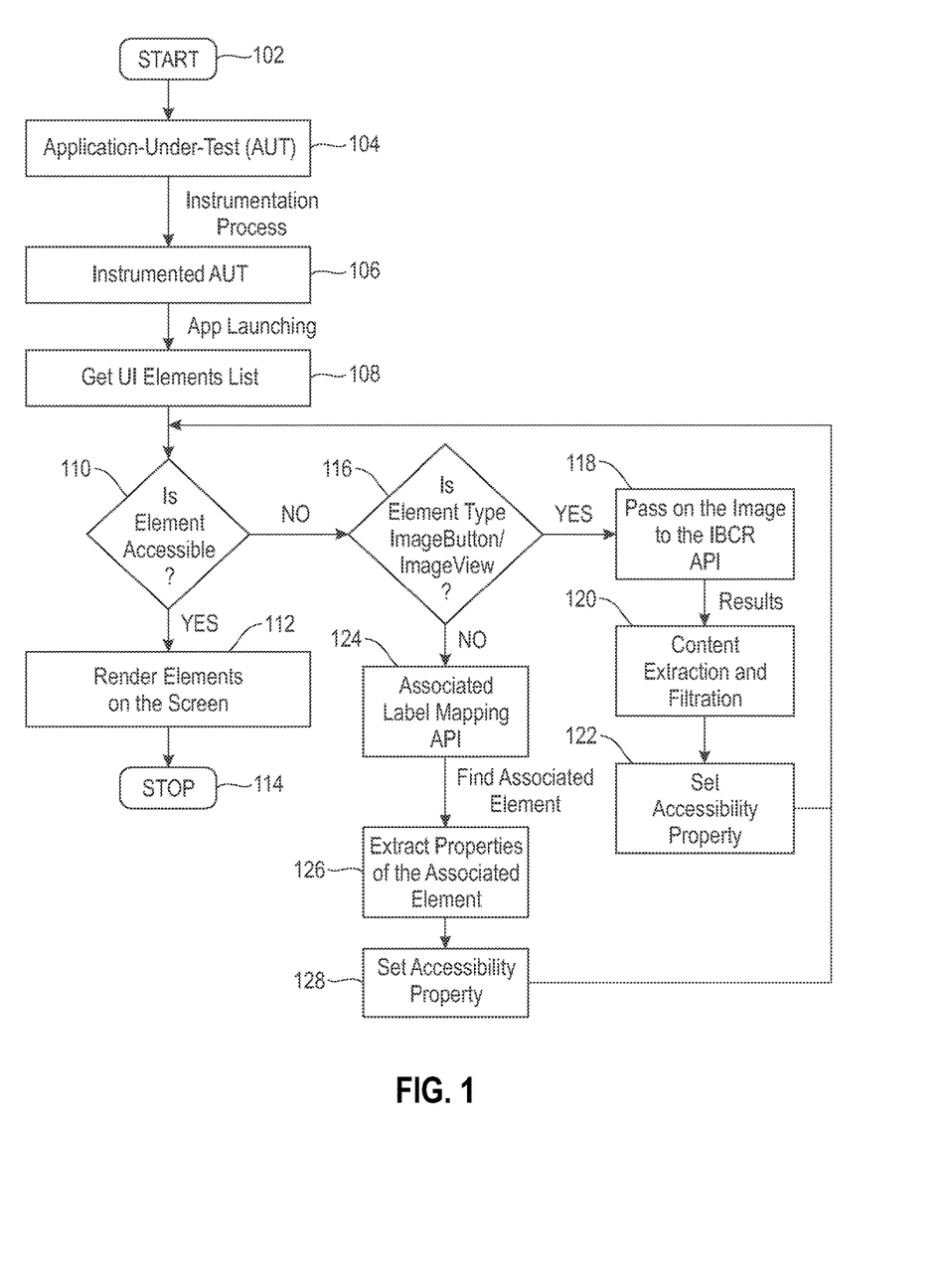
FIG. 1 is a flow diagram illustrating techniques according to an embodiment of the invention.

FIG. 1 is a flow diagram illustrating techniques according to an embodiment of the invention. The techniques begin at step 102, and subsequently, step 104 includes identifying and/or obtaining an application-under-test (AUT). Step 106 includes executing an instrumentation process on the AUT to generate an instrumented AUT. As used herein, instrumentation can include inserting one or more lines of code (also referred to as hooks) in the original application to facilitate mobile accessibility testing. Step 108 includes launching the AUT to obtain a list of all UI element details with respect to the application startup screen.

In step 110, a determination is made as to whether a given UI element is accessible. If yes (that is, the given UI element is accessible), then the techniques proceed to step 112, which includes forwarding the given UI element to a rendering queue and/or rendering the given UI element on the screen and subsequently ending the techniques at step 114. In at least one embodiment of the invention, the elements in the UI rendering queue are also rendered on the screen. If no (that is, a given UI element is not accessible), then step 116 includes determining whether the element type is ImageButton type and/or ImageView type and passing the given element to one of two modules detailed below. This determination is made based on the UI element type, which can be obtained, for example, from the UI view hierarchy of a particular UI screen. Accordingly, a view hierarchy is an extensible markup language (XML) representation of a particular UI screen and contains details about each individual UI element and its associated data (type, label, bounding coordinates, etc.).

If the query in step 116 is answered in the affirmative (that is, the element type is an ImageButton type and/or ImageView type), then the techniques continue to step 118, which includes forwarding the image to an IBCR application programming interface (API), which returns a text content description relevant to that particular image. Step 120 includes filtering the content and extracting the text that can be set as an accessibility property for that particular element. Accordingly, step 122 includes setting the accessibility property for the element and sending the same to the UI rendering queue.

If the query in step 116 is answered in the negative (that is, the element type is not an ImageButton type and/or ImageView type, but rather, the element type is TextField), then the techniques continue to step 124, which includes forwarding the element (that is, the TextField element) to an ALM API. The ALM API identifies an associated label in the vicinity of the TextField element (such as described below in connection with associated labels in the noted example ALM algorithm). Additionally, step 126 includes extracting one or more relevant properties of the associated label, and step 128 includes setting the accessibility property for the given element and sending the same to the UI rendering queue.

As noted above, relevant properties refer to the properties (type, label, bounding coordinates to determine the position of the element with reference to the inaccessible UI element, etc.) which can be used to arrive at an appropriate accessibility property for the UI element under consideration (that is, a given inaccessible UI element). For example, based on the label of an associated UI element, the accessibility property of an inaccessible element can be set as "TextBox located above Submit Button." In such an example, the inaccessible UI element is "TextBox" and "Submit Button" is the associated UI element. Additionally, relevant properties include Element Type=Button, and Element Label=Submit.

By way of example, at least one embodiment of the invention includes implementing an ALM algorithm that includes the following steps:

1. Collect and enqueue all labels in the same parent view.
2. Dequeue a given label and examine the label's direction with respect to a TAPPED object (whereby "TAPPED," in this example, refers to an object being touched by a user's finger on a smartphone touch screen). If the label exists on the CENTER/LEFT/ABOVE/RIGHT/BOTTOM side of the TAPPED object, then validate the label and again queue the label separately by tagging the label as CENTER/LEFT/ABOVE/RIGHT/BOTTOM with a priority value of 1 to 5, respectively. Otherwise, invalidate the label, discard the label, and repeat Step 2 if any label remains in the queue. For example, consider a scenario wherein the center rectangle in a grid is the inaccessible element and an associated element is to be identified from which the label text can be obtained and set as the accessibility property of the inaccessible element (that is, the center rectangle). Because there are multiple elements surrounding the inaccessible element (that is, the center rectangle), a priority order can be used to choose the correct label. In the above, example, the priority order is CENTER/LEFT/ABOVE/RIGHT/BOTTOM. Accordingly, because there is no element (label) in the CENTER, the closest LEFT element (label) can be selected as the associated element.
3. If the queue is not empty, repeat from Step 2.
4. Examine the count of the CENTER queue. If queue is empty, then proceed to Step 5. Otherwise, if the count=1, then dequeue the label from the CENTER queue, set the label as a required associated label and proceed to the Step 6. As used herein, a required associated label is the label of the element in the vicinity of the inaccessible element which will be set as an accessibility property of that inaccessible element.
5. Examine the count of the next priority queue, which, in this example embodiment, is LEFT→ABOVE→RIGHT→BOTTOM. If the next priority queue is empty, then repeat Step 5 with the subsequent priority queue. Otherwise, if the count=1, dequeue the label from the queue, set the label as a required associated label and proceed to the Step 6. If the count is >1, sort the queue with respect to the distance in between the label and the TAPPED object, dequeue the first label of the sorted queue, set that label as a required associated label, and proceed to Step 6.
6. Determine if it found any nearest associated label has been identified. As noted herein, the nearest associated label is the label of the element identified as an output of Step 5 of this example ALM algorithm. If YES (that is, a nearest associated label has been identified), then extract one or more relevant properties from the element. If NO (that is, a nearest associated label has not been identified), then repeat Step 1 with any successor parent (branches) that have not yet been discovered.

In at least one embodiment of the invention, the steps detailed above in connection with FIG. 1 are repeated for each screen load, and the ultimate output of the FIG. 1 techniques includes a completely accessible AUT.

Figure 2:
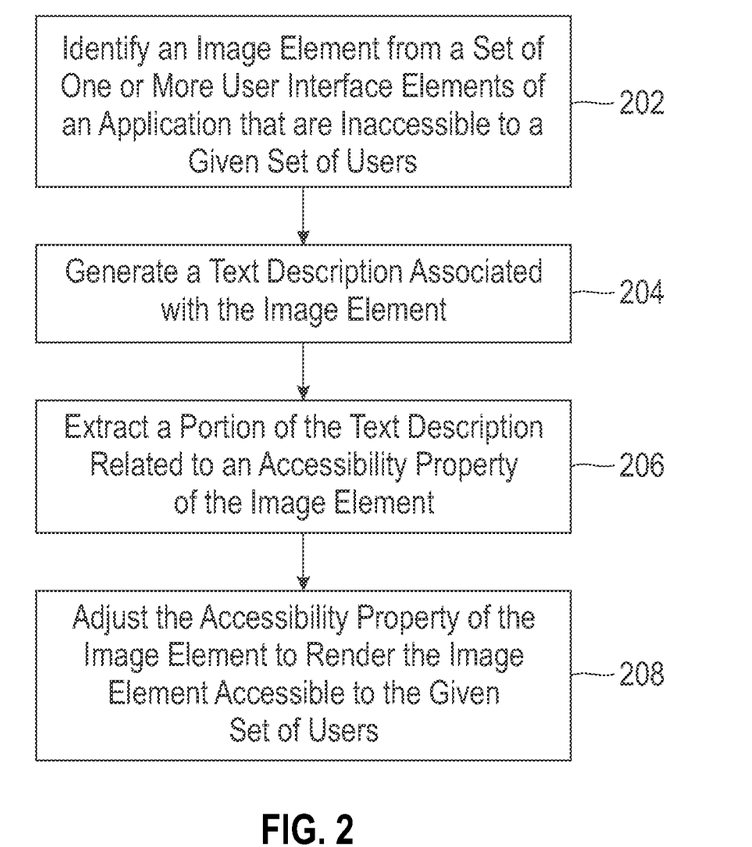
FIG. 2 is a flow diagram illustrating techniques according to an embodiment of the invention.

FIG. 2 is a flow diagram illustrating techniques according to an embodiment of the invention. Step 202 includes identifying an image element from a set of one or more user interface elements of an application that are inaccessible to a given set of users (for example, a mobile application). The identification step can include identifying the image element during execution of said application. Additionally, as described herein, the given set of users can include a set of users with one or more sensory impairments (such as a hearing impairment and/or a vision impairment).

Step 204 includes generating a text description associated with the image element. Generating the text description can include forwarding the image element to an image-based content retrieval application programming interface. Step 206 includes extracting a portion of the text description related to an accessibility property of the image element. Step 208 includes adjusting the accessibility property of the image element to render the image element accessible to the given set of users. The techniques depicted in FIG. 2 can also include sending the adjusted accessibility property to a user interface rendering queue.

At least one embodiment of the invention can additionally include executing an instrumentation process on the application to generate an instrumented version of the application. The instrumentation process can include inserting one or more lines of code in the application to facilitate accessibility testing. Also, the techniques depicted in FIG. 2 can include launching the application to obtain an identification of each of multiple user interface elements, as well as determining whether each of the multiple user interface elements is accessible to the given set of users.

Figure 3:
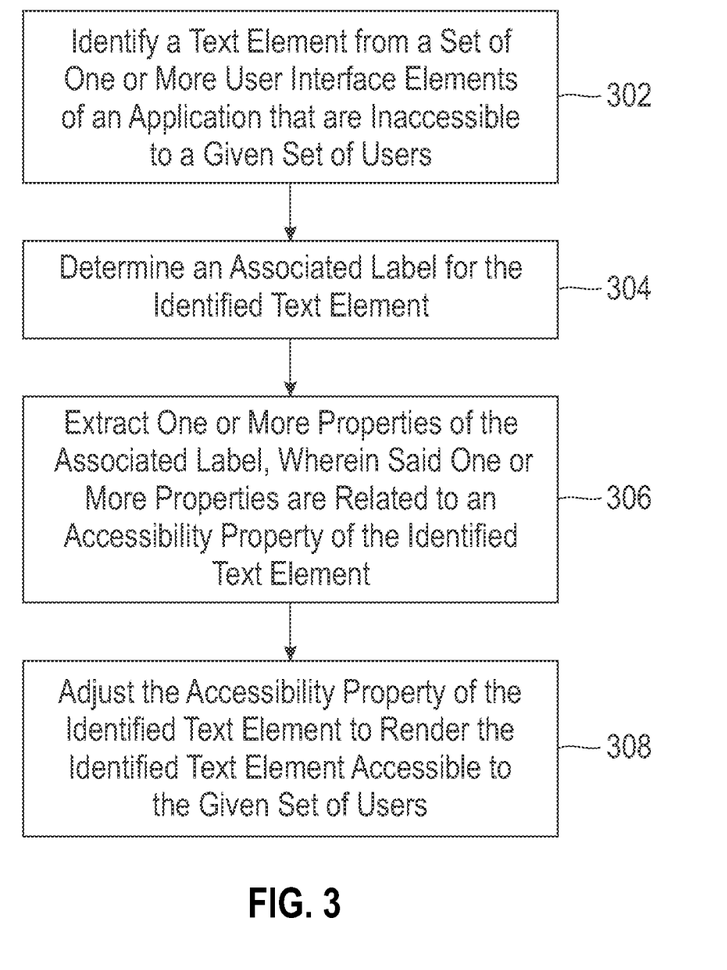
FIG. 3 is a flow diagram illustrating techniques according to an embodiment of the invention.

FIG. 3 is a flow diagram illustrating techniques according to an embodiment of the invention. Step 302 includes identifying a text element from a set of one or more user interface elements of an application that are inaccessible to a given set of users (for example, a mobile application). The identification step includes identifying a non-ImageButton and/or a non-ImageView element during execution of said application. Additionally, as described herein, the given set of users can include a set of users with one or more sensory impairments (such as a hearing impairment and/or a vision impairment).

Step 304 includes determining an associated label for the identified text element. The detection step can include forwarding the text element to an associated label mapping application programming interface. Step 306 includes extracting one or more properties of the associated label, wherein said one or more properties are related to an accessibility property of the identified text element. Step 308 includes adjusting the accessibility property of the identified text element to render the identified text element accessible to the given set of users. At least one embodiment of the invention also includes sending the adjusted accessibility property to a user interface rendering queue.

Additionally, at least one embodiment of the invention can further include executing an instrumentation process on the application to generate an instrumented version of the application. The instrumentation process can include inserting one or more lines of code in the application to facilitate accessibility testing. Also, the techniques depicted in FIG. 2 can include launching the application to obtain an identification of each of multiple user interface elements, as well as determining whether each of the multiple user interface elements is accessible to the given set of users.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
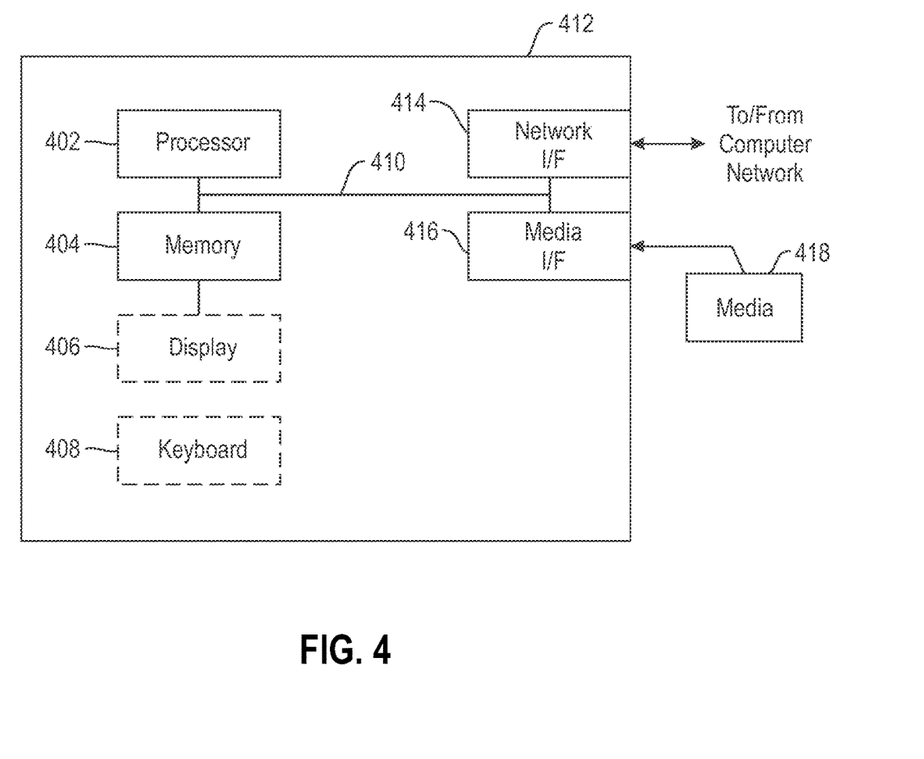
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically fixing the inaccessibility nature of a mobile application UI widget dynamically during run-time by using the output from associated label mapping and image-based content retrieval.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying, during execution of a mobile application, an image element from a set of one or more user interface elements of the mobile application that is inaccessible to a set of users, wherein said set of users comprises at least one of (i) one or more users with a hearing impairment and (ii) one or more users with a vision impairment, wherein said identifying comprises determining that the image element is one of: an ImageButton type element and an ImageView type element based on corresponding user interface element type information derived from a user interface view hierarchy of a given user interface screen, wherein the user interface view hierarchy is an extensible markup language representation of the given user interface screen and comprises multiple items of information pertaining to each user interface element in the screen, wherein said multiple items of information comprise user interface element type, user interface element label, and bounding coordinates of the user interface element;
   transmitting an image associated with the image element to an image-based content retrieval application programming interface;
   generating, during execution of the mobile application and via the image-based content retrieval application programming interface, a text description associated with the image element;
   extracting, during execution of the mobile application, at least a portion of the text description related to an accessibility property of the image element; and
   adjusting, during execution of the mobile application, the accessibility property of the image element to render the image element accessible to the set of users;
   wherein said identifying, said transmitting, said generating, said extracting, and said adjusting are carried out by at least one computing device.

2. The method of claim 1, comprising:
   executing an instrumentation process on the mobile application to generate an instrumented version of the mobile application, wherein said instrumentation process comprises inserting one or more lines of code in the mobile application to facilitate accessibility testing.

3. The method of claim 1, comprising:
   launching the mobile application to obtain an identification of each of multiple user interface elements.

4. The method of claim 3, comprising:
   determining whether each of the multiple user interface elements is accessible to the set of users.

5. The method of claim 1, wherein the ImageButton type element and the ImageView type element are defined based on a mobile operating system of the at least one computing device.

6. A computer program product, the computer program product comprising a computer readable storage medium having program instructions embodied therewith, the program instructions executable by a computing device to cause the computing device to:
identify, during execution of a mobile application, an image element from a set of one or more user interface elements of the mobile application that is inaccessible to a set of users, wherein said set of users comprises at least one of (i) one or more users with a hearing impairment and (ii) one or more users with a vision impairment, wherein identifying comprises determining that the image element is one of: an ImageButton type element and an ImageView type element based on corresponding user interface element type information derived from a user interface view hierarchy of a given user interface screen, wherein the user interface view hierarchy is an extensible markup language representation of the given user interface screen and contains multiple items of information pertaining to each user interface element in the screen and, wherein said multiple items of information comprise user interface element type, user interface element label, and bounding coordinates of the user interface element;
transmit an image associated with the inaccessible image element to an image-based content retrieval application programming interface;
generate, during execution of the mobile application and via the image-based content retrieval application programming interface, a text description associated with the image element;
extract, during execution of the mobile application, a portion of the text description related to an accessibility property of the image element; and
adjust, during execution of the mobile application, the accessibility property of the image element to render the image element accessible to the set of users.

7. The computer program product of claim 6, wherein the ImageButton type element and the ImageView type element are defined based on a mobile operating system of the at least one computing device.

8. A method comprising steps of:
identifying, during execution of a mobile application, an image element and a text element, from a set of one or more user interface elements of the mobile application, that are inaccessible to a set of users, wherein said set of users comprises at least one of: (i) one or more users with a hearing impairment and (ii) one or more users with a vision impairment, wherein said identifying comprises determining that the text element is a TextField type element and the image element is one of: an ImageButton type element and an ImageView type element based on corresponding user interface element type information derived from a user interface view hierarchy of a given user interface screen, wherein the user interface view hierarchy is an extensible markup language representation of the given user interface screen and contains data pertaining to each user interface element in the screen;
transmitting the text element to an associated label mapping application programming interface and an image associated with the inaccessible image element to an image-based content retrieval application programming interface;
determining, during execution of the mobile application and via the associated label mapping application programming interface, an associated label within a vicinity of the identified text element;
extracting, during execution of the mobile application, multiple properties of the associated label, wherein said multiple properties are related to an accessibility property of the identified text element, and wherein said multiple properties comprise label type, label description, and bounding coordinates relative to the inaccessible text element;
generating, during execution of the mobile application and via the image-based content retrieval application programming interface, a text description associated with the inaccessible image element;
extracting, during execution of the mobile application, at least a portion of the text description related to an accessibility property of the inaccessible image element; and
adjusting, during execution of the mobile application, the accessibility property of each of the identified text element and the identified image element to render the identified text element and the identified image element accessible to the set of users;
wherein the steps are carried out by at least one computing device.

9. The method of claim 8, comprising:
executing an instrumentation process on the mobile application to generate an instrumented version of the mobile application, wherein said instrumentation process comprises inserting one or more lines of code in the mobile application to facilitate accessibility testing.

10. The method of claim 8, comprising:
launching the mobile application to obtain an identification of each of multiple user interface elements.

11. The method of claim 10, comprising:
determining whether each of the multiple user interface elements is accessible to the set of users.

12. The method of claim 8, wherein the ImageButton type element, the ImageView type element and the TextField type element are defined based on a mobile operating system of the at least one computing device.

13. A computer program product, the computer program product comprising a computer readable storage medium having program instructions embodied therewith, the program instructions executable by a computing device to cause the computing device to:
identify, during execution of a mobile application, an image element and a text element, from a set of one or more user interface elements of the mobile application, that are inaccessible to a set of users, wherein said set of users comprises at least one of: (i) one or more users with a hearing impairment and (ii) one or more users with a vision impairment, wherein said identifying comprises determining that the text element is a TextField type element and the image element is one of: an ImageButton type element and an ImageView type element based on corresponding user interface element type information derived from a user interface view hierarchy of a given user interface screen, wherein the user interface view hierarchy is an extensible markup language representation of the given user interface screen and contains data pertaining to each user interface element in the screen;

transmit the text element to an associated label mapping application programming interface and an image associated with the inaccessible image element to an image-based content retrieval application programming interface;

determine, during execution of the mobile application and via the associated label mapping application programming interface, an associated label within a vicinity of the identified text element;

extract, during execution of the mobile application, multiple properties of the associated label, wherein said multiple properties are related to an accessibility property of the identified text element, and wherein said multiple properties comprise label type, label description, and bounding coordinates relative to the inaccessible text element generate, during execution of the mobile application and via the image-based content retrieval application programming interface, a text description associated with the inaccessible image element;

extract, during execution of the mobile application, at least a portion of the text description related to an accessibility property of the inaccessible image element; and adjust, during execution of the mobile application, the accessibility property of each of the identified text element and the identified image element to render the identified text element and the identified image element accessible to the set of users.

14. The computer program product of claim 13, wherein the ImageButton type element, the ImageView type element, and the TextField type element are defined based on a mobile operating system of the at least one computing device.

* * * * *